United States Patent [19]

Unger

[11] 4,290,487
[45] Sep. 22, 1981

[54] HORSE BOOT

[76] Inventor: William O. Unger, 355 Rustic Pl., Eugene, Oreg. 97401

[21] Appl. No.: 122,298

[22] Filed: Feb. 19, 1980

[51] Int. Cl.³ .............................................. A01L 3/00
[52] U.S. Cl. .......................................... 168/18; 54/82
[58] Field of Search ...................... 168/1, 2, 3, 12, 17, 168/18, 27; 54/82

[56] References Cited

U.S. PATENT DOCUMENTS

| 149,572 | 4/1874 | Butchers | 54/82 |
|---|---|---|---|
| 152,975 | 7/1874 | Dean | 168/1 |
| 2,041,538 | 5/1936 | Gash et al. | 168/4 |
| 3,486,561 | 12/1969 | Kulak | 54/82 X |
| 3,732,929 | 5/1973 | Glass | 168/18 |
| 4,212,356 | 7/1980 | Battle | 168/18 |

FOREIGN PATENT DOCUMENTS 77679 11/1950 Netherlands ........................ 168/12

OTHER PUBLICATIONS

"Easyboot" advertising brochure, Les-Kare Inc., Pojoaque, New Mexico 87501.

Primary Examiner—Robert P. Swiatek
Attorney, Agent, or Firm—James D. Givnan, Jr.

[57] ABSTRACT

A horse boot for resilient engagement about the hoof wall and adjacent hoof structure. A boot wall extends upwardly from the perimeter of a boot sole and includes a flexible rear wall portion of generally concave-convex shape. The rear wall portion is flexible to permit manual repositioning thereof downwardly about the rear edge of the sole to open the boot for passage of the horse's hoof into place. A raised rear portion of the rear wall contributes to hoof engagement. The boot sole may be perforate to receive horseshoe projections.

3 Claims, 4 Drawing Figures

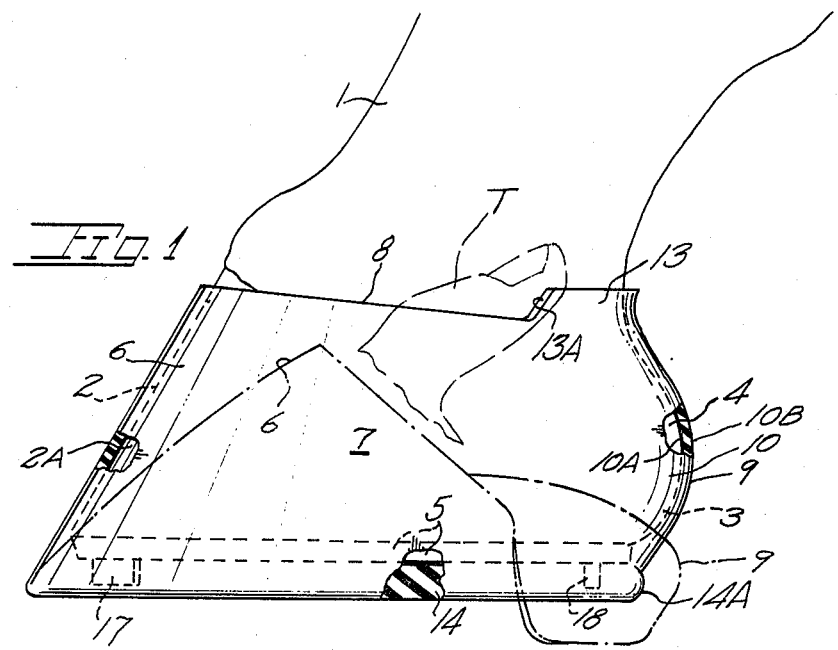
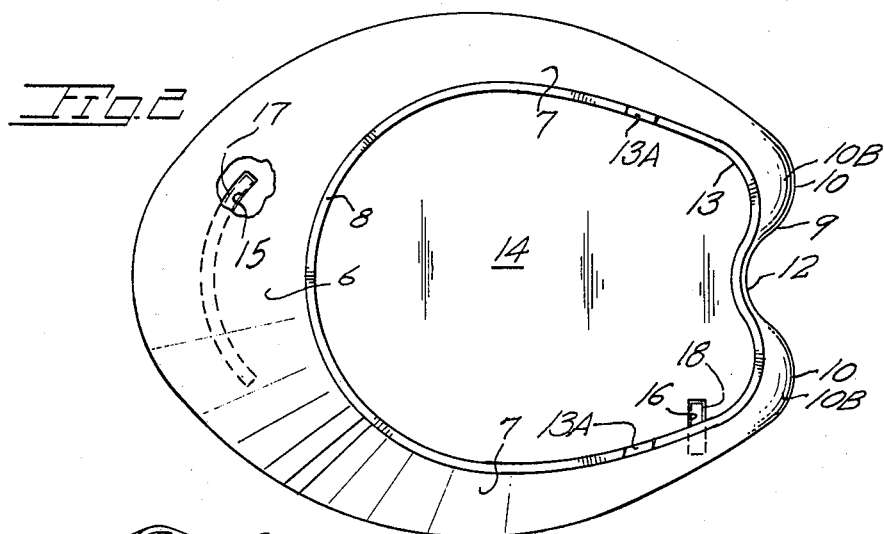
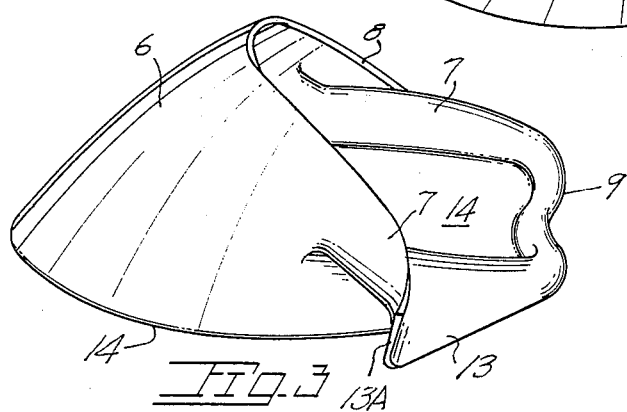
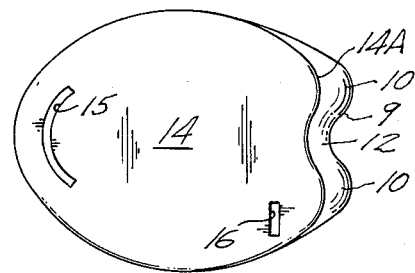

HORSE BOOT

BACKGROUND OF THE INVENTION

The present boot is intended for protective application to the hooves of horses.

The prior art includes several styles of boots or hoof coverings for horses typically used for protective purposes. A problem common to known boot designs and analogous hoof coverings is that of boot retention. As the forces imparted to such a boot are random and severe, boot loss is a common occurrence. Various solutions to the problem have been proposed with different degrees of success including boots with straps, boots with hinged wall portions, boots shrunk to the hoof, molding of the boot to the hoof, boots of molded construction have all been proposed. Such solutions also do not overcome installation difficulties and do not result in a boot which may be readily applied and removed by the typical horse owner. Boots secured with straps are difficult and time consuming to apply and are subject to loss upon strap separation or failure.

While one piece elastomeric boots have been suggested, the same are of thick wall construction and not intended for partial reversing to facilitate installation and removal.

Of the known prior art, U.S. Pat. Nos. 2,988,828; 3,486,561 disclose an animal boot of unitary molded construction having an annular wall of only limited resiliency: U.S. Pat. Nos. 2,446,371; 2,064,566; 3,209,726 disclose boots for dogs which are of flexible construction and generally shaped to fit the foot: U.S. Pat. No. 3,285,346 discloses a hoof covering molded in place to the hoof lower surfaces: U.S. Pat. Nos. 3,794,119; 4,155,406 disclose boots held in place by straps or a strap: U.S. Pat. 3,236,310 discloses a boot of heat sensitive material thermally shrunk into place on the hoof: U.S. Pat. 3,967,683 discloses a bifurcated boot for clamping to the hoof: U.S. Pat. 3,386,226 discloses an elastomeric scalper type covering disposable about the hoof to protect the hoof: U.S. Pat. Nos. 3,703,209; 3,732,929 disclose molded boots for horses secured in place by a cable and toggle arrangement. U.S. Pat. No. 2,041,538 discloses a rubber horse boot having a continuous wall integral with the boot sole with the frontal wall portion being of greater height than the rear wall portion.

SUMMARY OF THE PRESENT INVENTION

The present invention is embodied in a protective boot of unitary construction shaped so as to lend itself to temporary radical distortion for hoof application.

The present boot may include a solid or perforate bottom wall the latter receiving projections as of the type found on racing plates and horseshoes. A boot wall has frontal and side portions which lie in a superimposed manner over the hoof wall while a rear portion of the boot wall is shaped to overlie the bulbs and cartilage of the heel. Said rear portion is of wall construction so as to be displaceable during boot application to a static, reversed position enabling rear entry of the hoof into the boot and hence greatly facilitates installation by avoidance of pulling and stretching of the boot annular wall. With the boot in place, the boot wall grips the hoof in a secure manner permitting dispensing with cumbersome straps, ties, buckles, etc., used on known boots.

Important objects of the present boot include the provision of a boot having an upright wall adapted for secure, gripping engagement about the hoof without the use of cumbersome boot appendages; the provision of a boot having a deformable rear wall portion which is temporarily displaced or rolled below the boot sole to permit hoof advancement into the boot; the provision of a boot having an upright wall which is of a resilient nature to exert a gripping action on hoof surfaces; the provision of a boot which the typical horse owner may both install and remove in a highly convenient manner without the aid of tools; the provision of an easily applied boot which may be used to retain medicinal preparations on hoof areas; the provision of such a boot which protects show horses' hooves from collecting dirt and dust prior to showing of the horse; the provision of a boot for protecting horses during breeding from cuts by horseshoe projections; the provision of a horse boot having an elevated rear wall portion to facilitate boot retention and removal.

BRIEF DESCRIPTION OF THE DRAWING

In the accompanying drawing

FIG. 1 is a side elevational view of the boot on a reduced scale with a reversed back wall portion shown in broken lines;

FIG. 2 is a top plan view of FIG. 1 with the boot removed from the hoof;

FIG. 3 is a perspective view of the boot with the boot wall configured to a reversed position enabling hoof advancement into the boot; and FIG. 4 is a bottom plan view of FIG. 2 on a greatly reduced scale.

DETAILED DESCRIPTION OF THE PREFERRED EMBODIMENTS

With continuing attention to the drawing, the reference numeral 1 indicates the lower portion of a horse's leg with the bony hoof wall shown at 2 and having a toe or front 2A. A heel bulb (one of a pair) is shown at 3. Protruding cartilage is shown at 4. The present hoof is adapted for application to shod and unshod horses. A racing plate type horseshoe is shown at 5 having downward projections as later noted.

The present invention is embodied in a boot which is of an elastomeric nature is later elaborated upon. The boot includes an upright perimetrical wall having a frontal portion 6, side portions as at 7 inclined upwardly and inwardly corresponding to the hoof wall and terminating at a rim 8. Said frontal and side portions overlie the toe and quarters (sides) of the hoof wall with the boot side portions jointly overlying the hoof wall heels.

A rear wall portion at 9 of the boot is of a flexible nature and a bulbous configuration having rearwardly extending protuberances 10 with concave-convex inner and outer surfaces at 10A and 10B which overlie the pair of heel bulbs 3 and cartilage 4. For purposes of fit it is preferred that the rear wall portion have a central, upwardly extending valley at 12. A rear elevated rim portion is indicated at 13 with end surfaces at 13A.

A boot sole at 14 defines openings at 15 and 16 and, if desired, may be provided with a tread pattern for traction purposes. A sole rear edge is at 14A. The sole may, of course, be imperforate as for example when the boot is to be used on unshod horses or for medicinal applications or when the horseshoe has no downwardly extending projections. Openings at 15 and 16 are located and shaped to receive a toe grab 17 and a sticker 18 of a racing plate to isolate same from injurious contact with another portion of the horse or other horse.

In use, the boot rear wall portion is manually repositioned or reversed to the FIG. 3 configuration preparatory to boot application. Such reversal is best done by placing the thumbs as at T at the ends 13A of the extended rim with the index fingers at the juncture of the rear wall 9 and the rear edge 14A (FIG. 4) of the sole whereupon rearward thumb movement causes said rear wall portion to progressively roll rearwardly and downwardly over itself and the rear sole edge. The boot is static when in the reversed FIG. 3 configuration and accordingly may be handled with one hand while the remaining hand is used to steady the hoof. The boot may then be advanced in a direction generally parallel to the sole to cause hoof wall 2A to seat against the boot frontal wall. Per FIG. 1, the boot frontal wall retains an upright disposition when the rear wall is reversed. The final step is performed by lifting the boot rear wall portion which readily rolls upwardly back into the normal position of FIG. 1. Removal from the hoof entails returning the rear wall portion to the reversed position enabling forward removal of the boot.

In one embodiment, the boot is formed by a conventional molding process of a soft, highly resilient elastomer such as ethylene propylene diene having an abrasion index rating of 150 ASTM or above with ultimate tensile strength of 2000 PSI and ultimate elongation at rupture at 400 percent. The wall structure is of a flexible nature approximately one-eighth inch thickness. Another suitable synthetic elastomer is neoprene rubber. The sole is of about one-half inch thickness. Frontal portion 6 of the boot has an overall vertical dimension of approximately three inches. The boot is manufactured in a range of different sizes which may be correlated to hoof width for proper boot size selection. In place, the somewhat stretched boot exerts inwardly directed forces on the hoof and adjacent rearward areas but only to an acceptable degree, e.g., a pressure not exceeding that resulting from conventional therapeutic wrappings applied to the hoof area. Rear wall portion 9 being larger than opposed frontal portion 6 of the boot will result in contractive, boot exerted forces being applied over a larger area to assure the avoidance of undue forces on the hoof bulbs and superjacent cartilage. Further rear wall portion 9, when reversed, does not unduly reduce the included angle defined by frontal portion 6 and side portions 7 with the boot sole 14 (per broken line position of FIG. 1) which would otherwise hinder hoof advancement into the boot.

While I have shown and described but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A boot for a horse's hoof comprising,
   a sole having a rear edge,
   a resilient wall extending upwardly from the sole perimeter and including a frontal portion, side portions and a rear portion, said rear wall portion of rearwardly protuberant configuration, said rear wall portion including an elevated rim portion providing a rear wall portion of greater height than the remaining portions of the boot wall, said elevated rim portion terminating laterally in end surfaces located substantially above the juncture of the rear and side portions of the boot wall and adapted to receive the application of finger exerted pressure during manual repositioning of the rear wall portion to a reversed position downwardly below said rear edge of the sole to permit passage of a hoof in a direction generally parallel to said sole into place on the sole whereupon the rear wall portion may be restored to its raised normal position, said reversed position permitting the frontal and side portions of the boot wall to avoid radical inward displacement and remain unobstructive of hoof entry.

2. The boot claimed in claim 1 wherein said sole defines an opening therethrough for reception of a horseshoe projection.

3. The boot claimed in claim 1 wherein said rear wall portion has a pair of laterally spaced protuberances for for reception of hoof heel bulbs and superjacent hoof cartilages.

* * * * *